Dec. 8, 1925.
J. BOOSH
1,565,050
ANTISKID ATTACHMENT FOR WHEELS
Filed March 5, 1925
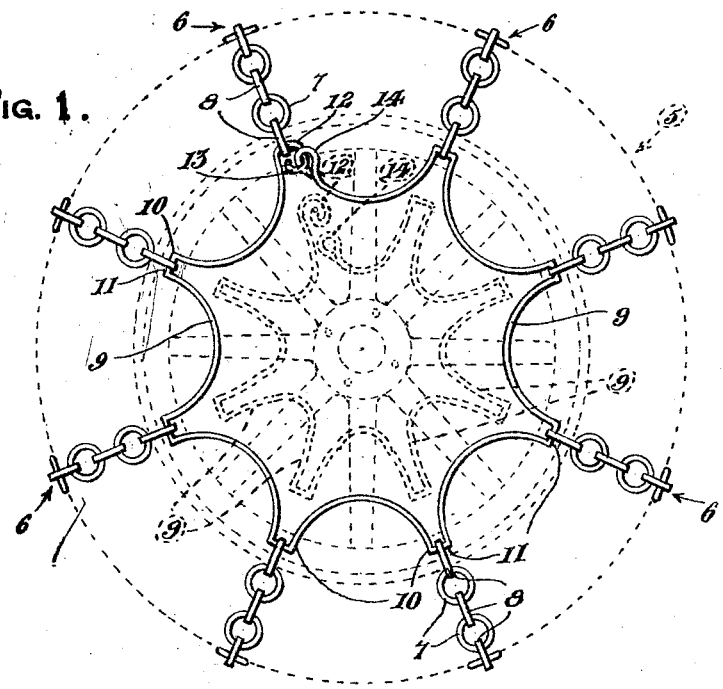
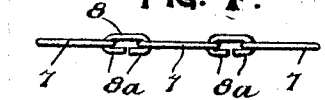
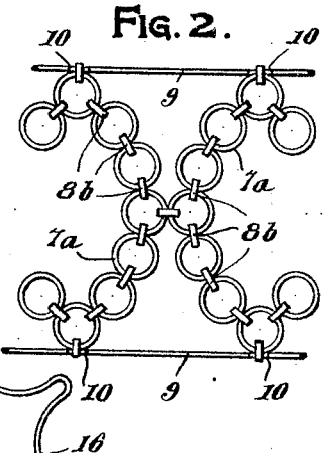
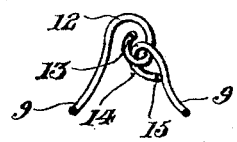
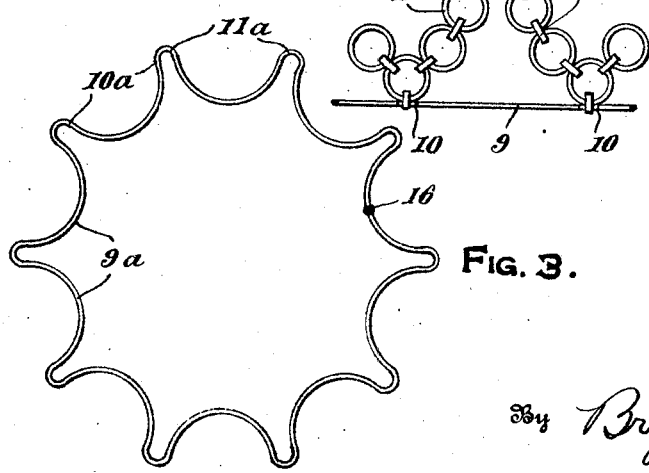
Inventor
J. Boosh
By Bryant & Lowry
Attorneys Patented Dec. 8, 1925.

1,565,050

UNITED STATES PATENT OFFICE.

JOHN BOOSH, OF CLEVELAND, OHIO, ASSIGNOR OF ONE-HALF TO STEVE KRAUS, OF CLEVELAND, OHIO.

ANTISKID ATTACHMENT FOR WHEELS.

Application filed March 5, 1925. Serial No. 13,206.

*To all whom it may concern:*

Be it known that I, JOHN BOOSH, a citizen of Poland, residing at Cleveland, in the county of Cuyahoga and State of Ohio, have invented certain new and useful Improvements in Antiskid Attachments for Wheels, of which the following is a specification.

This invention relates to improvements in anti-skid attachments for wheels.

The primary object of the invention is to provide an improved form of circumferential side members for holding the cross tread members in place upon a wheel.

A further object of the invention is to provide a type of side member which will place an equal amount of tension on each cross tread member and will hold the latter taut at all times.

Other objects and advantages of the invention will be apparent during the course of the following description.

In the accompanying drawing forming a part of this specification and in which like numerals are employed to designate like parts throughout the same, Figure 1 is an elevational view of a vehicle wheel and tire, shown in dotted lines, with one form of the anti-skid attachment embodying this invention properly assembled thereupon, and further shows in dotted lines one of the circumferential side members contracted or in its normal state, Figure 2 is a fragmentary plan view of a type of anti-skid attachment embodying this invention and shows a modified form of cross tread member to that form shown in Fig. 1, Figure 3 is a detail elevational view of a modified form of circumferential side member, Figure 4 is a detail edge view of one of the cross tread members, and Figure 5 is a fragmentary elevational view of the means employed for detachably connecting the ends of the circumferential side members shown in Fig. 1.

In the drawing, wherein for the purpose of illustration is shown a preferred embodiment of this invention, the numeral 5 designates a vehicle wheel and a tire. Mounted upon this wheel 5 are a plurality of cross tread members 6 which extend truly transversely of the tread of the tire and consist of a plurality of rings 7 connected by links 8, the links being shown in detail in Fig. 4 as consisting of a short section of wire bent at its opposite ends to form the loops $8^a$ which enclose the adjacent rings 7.

The circumferential side member shown in full lines in Fig. 1 is formed from a single strand of spring wire of a suitable gage and consists of a plurality of bowed portions 9 which are connected at their adjacent terminals 10 by the straight connecting portions 11. It will be seen, by comparing the dotted line showing of the side member with the full line showing in Fig. 1, that the bowed portions 9, when the cross tread members are not arranged upon a tire or wheel, are of substantially a semi-elliptical formation and that when the cross tread members 6 are fitted upon a tire or wheel, the bowed members 9 are partially straightened out or are changed in contour to assume substantially semi-circular bows. The stretching or straightening out of these bowed portions will place an equal tension on each of the cross tread portions for constantly maintaining the same taut.

For the purpose of mounting and dismounting this anti-skid attachment, one end of the strand of wire forming a circumferential side member is shaped or bent into a substantially circular loop 12 which is left partially open at 13. The remaining end of each strand is formed or bent into an elongated loop 14 which may be closed or left open at 15. It will now be seen that by disconnecting the loops 12 and 14, the anti-skid attachment may be removed from the wheel 5.

In Fig. 2 the opposite side members are illustrated as having attached to the straight connecting portions 10 a different type of cross tread member which is formed of a plurality of rings $7^a$ connected by links $8^b$, but these rings and links are joined to form substantially diamond-shaped cross tread members instead of the truly transversely extending cross tread members 6 shown in Fig. 1, it being understood that any preferred form of cross-tread member may be employed.

In Fig. 3 there is illustrated a modified form of circumferential side member, the same being made from a single strand of wire bent to provide the bowed portions $9^a$ and the curved connecting portions $11^a$ which join the terminal ends $10^a$ of the adjacent bowed portions. This circumferential side member differs from the form shown in Fig. 1 in that it has the ends of the strand of wire from which it is formed welded together at 16. It will be understood that when the form of circumferential side member shown in Fig. 3 is employed, it is used as the outer side member while a side member of the type shown in Fig. 1 is used as the inner member and the cross tread members are detachably connected to the curved connecting portions 11ª instead of being permanently connected as illustrated in Figs. 1 and 2. It will now be understood that by disconnecting a few of the cross tread members from the curved connecting portions 11ª of the circumferential side member shown in Fig. 3, the anti-skid attachment may be readily and easily mounted upon a wheel.

It is now believed that the method of constructing and manner of using the anti-skid attachments embodying this invention will be clearly understood from the above detail description and that no further explanation is deemed necessary. It is to be understood that the forms of this invention herewith shown and described are to be taken as preferred examples of the same, and that various changes in the shape, size, and arrangement of parts may be resorted to without departing from the spirit of the invention or the scope of the subjoined claim.

Having thus described the invention, I claim:—

In an anti-skid attachment for wheels, a pair of circumferential side members each formed from a single strand of spring wire bent to form a plurality of bowed portions and straight connecting portions between the adjacent terminals of the bowed portions, means for detachably connecting the ends of each side member, and a plurality of cross tread members connected to the said straight connecting portions, the bowed portions of the side members being partially straightened when the attachment is applied to a wheel to cause the same to exert an equal tension on all of the cross tread members.

In testimony whereof I affix my signature.

JOHN BOOSH.